US009031816B2

(12) United States Patent
Chen et al.

(10) Patent No.: US 9,031,816 B2
(45) Date of Patent: May 12, 2015

(54) INDEPENDENT COMPONENT ANALYSIS PROCESSOR

(75) Inventors: Chiu-Kuo Chen, Hsinchu (TW); Wai-Chi Fang, Hsinchu (TW); Ericson Chua, Hsinchu (TW); Chih-Chung Fu, Hsinchu (TW); Shao-Yen Tseng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 352 days.

(21) Appl. No.: 13/149,323

(22) Filed: May 31, 2011

(65) Prior Publication Data

US 2012/0158367 A1    Jun. 21, 2012

(30) Foreign Application Priority Data

Dec. 17, 2010   (TW) .............................. 99144420 A

(51) Int. Cl.
  *G06K 9/00*     (2006.01)
  *G06K 9/62*     (2006.01)

(52) U.S. Cl.
  CPC .......... *G06K 9/00986* (2013.01); *G06K 9/6242* (2013.01)

(58) Field of Classification Search
  CPC ... G06F 19/24; G06F 13/1673; G06K 9/6293; G06K 9/66
  USPC ........................................................ 702/190
  See application file for complete search history.

(56) References Cited

U.S. PATENT DOCUMENTS

| 5,537,601 | A | * | 7/1996 | Kimura et al. ................... 712/35 |
| 6,095,980 | A | * | 8/2000 | Burns et al. .................... 600/453 |
| 6,122,608 | A | * | 9/2000 | McCree ......................... 704/219 |
| 6,799,170 | B2 |  | 9/2004 | Lee et al. |
| 7,185,260 | B2 | * | 2/2007 | Coombs et al. ................ 714/755 |
| 7,336,982 | B2 | * | 2/2008 | Yoo ............................... 600/323 |
| 7,519,512 | B2 |  | 4/2009 | Spence et al. |
| 7,711,762 | B2 | * | 5/2010 | Howard et al. ............... 708/490 |
| 7,818,357 | B2 | * | 10/2010 | Bredehoft ..................... 708/233 |
| 2002/0051500 | A1 | * | 5/2002 | Gustafsson ................... 375/295 |
| 2003/0112854 | A1 | * | 6/2003 | Shi et al. ....................... 375/147 |

(Continued)

OTHER PUBLICATIONS

Shyu, et al., "FPGA Implementation of Fast ICA based on Floating-Point Arithmetic Design for Real-Time Blind Source Separation", IEEE, pp. 2785-2792.

(Continued)

*Primary Examiner* — Janet Suglo
*Assistant Examiner* — Michael Dalbo
(74) *Attorney, Agent, or Firm* — Mintz Levin Cohn Ferris Glovsky and Popeo, P.C.; Peter F. Corless; Steven M. Jensen

(57) ABSTRACT

An independent component analysis processor conducts real-time operations of multiple-channel parallel signals. The processor includes an input buffering unit for receiving and storing multiple-channel parallel signals, a mean/covariance unit, a centering unit for removing direct current components in the multiple channels parallel signals, a whitening unit for performing a whitening process, and an ICA training unit and an ICA calculating unit that perform an independent component analysis process, to calculate independent components in the multiple-channel parallel signals and separate artifacts from the signals.

8 Claims, 9 Drawing Sheets

(56) References Cited

U.S. PATENT DOCUMENTS

| | | | |
|---|---|---|---|
| 2005/0149462 A1* | 7/2005 | Lee et al. | 706/20 |
| 2007/0025564 A1* | 2/2007 | Hiekata et al. | 381/94.2 |
| 2008/0148215 A1* | 6/2008 | Gutberlet et al. | 716/18 |
| 2010/0036997 A1* | 2/2010 | Brewer et al. | 711/5 |
| 2011/0307251 A1* | 12/2011 | Tashev et al. | 704/231 |

OTHER PUBLICATIONS

Huang, et al., "FPGA Implementation of 4-Channel ICA for On-Line EEG Signal Separation", IEEE, pp. 65-68.

Chen, et al., "A VLSI Implementaton of EEG Signal Processing for Portable Brain Monitoring Systems", Published Jun. 18, 2010.

* cited by examiner

INDEPENDENT COMPONENT ANALYSIS PROCESSOR

BACKGROUND OF THE INVENTION

1. Field of the Invention

This invention relates to independent component analysis processors, and particularly, to an independent component analysis processor that separates independent components from measured or monitored signals in real-time.

2. Description of Related Art

An Electroencephalography (EEG) is obtained by recording and amplifying weak biological electric signals generated by brain neural with medical instrument. A principle component analysis (PCA) and an independent component analysis (ICA) are two of the most popular in the art to process the brain wave signals. The ICA may separate noises from the brain wave signals.

U.S. Pat. No. 6,799,170 provides a system and method of separating signals. The system comprises a plurality of sensors that receive a mixture of source signals, a processor and an independent component analysis module. The processor takes samples of the mixture of source signals and stores each sample as a data vector to create a data set. The independent component analysis module performs an independent component analysis of the data vectors to separate an independent source signal from other signals in the mixture of source signals. The system, however, is bulky. U.S. Pat. No. 7,519,512 provides a dynamic blind signal separation method, which uses a Jacobi technique to decorrelate with small update angles to generate decorrelated orthonormal signals. The orthonormal signals are initialized and undergo an independent component analysis with small angle updates using statistics higher than second order to produce separated signals. The method, when embodied in a computer, is also bulky.

A document entitled "FPGA Implementation of FastICA based on Floating-Point Arithmetic Design for Real-Time Blind Source Separation" employs a field programmable gate array (FPGA) to realize a 2-channel FastICA in a floating-point design, to separate voice signals. A ping-pong memory hierarchy architecture is employed. A method thus provided for decomposing an eigenvector is not easy to be applied to three or more channels. Another document entitled "FPGA implementation of 4-channel ICA for on-line EEG signal separation", though applicable to 4-channel ICA channels, does not have a pre-processing architecture, and thus convergence time is longer when the independent component analysis is performed. Therefore, how to realize a real-time operation of an independent component analysis with hardware, increase operation efficiency, and reduce the hardware cost is becoming one of the popular challenges in the signal processing field.

SUMMARY OF THE INVENTION

In view of the above-mentioned problems of the prior art, the present invention provides an independent component analysis processor, to realize the objectives of using cheap and simple hardware to conduct an independent component analysis.

The independent component analysis processor performs an independent component analysis process on multiple-channel parallel signals having raw data, and includes: an input buffering unit that receives the multiple-channel parallel signals and outputs the raw data; a mean/covariance unit that calculates a mean and a covariance of the raw data; a centering unit that centers the raw data according to the mean of the raw data, to obtain zero-mean data; a whitening unit that receives and performs a whitening process on the covariance of the raw data and the zero-mean data, to obtain a whitening matrix and an uncorrelated data stream; an ICA training unit that receives the uncorrelated data stream from the whitening unit and calculates an unmixing weight matrix; and an ICA calculating unit that receives the unmixing weight matrix and the whitening matrix, calculates a whitening unmixing matrix, and calculates independent components of the multiple-channel parallel signals according to the whitening unmixing matrix and the raw data.

In an embodiment of the present invention, the whitening unit has a singular value decomposition processing element that receives the covariance of the raw data and calculates an eigenvalue matrix and an eigenvector matrix of the covariance; an inverse square root element that receives the eigenvalue matrix and calculates an inverse square root of the eigenvalue matrix; and a multiplier accumulator that calculates the whitening matrix according to the eigenvector matrix and the inverse square root of the eigenvalue matrix, and calculates the uncorrelated data stream according to the whitening matrix and the zero-mean data.

In an embodiment of the present invention, the input buffering unit comprises an interleaving memory. In a preferred embodiment of the present invention, the interleaving memory comprises at least three memory banks for sequentially storing the raw data in the multiple-channel parallel signals, and the input buffering unit employs the interleaving memory that comprises the at least three memory banks to realize a sliding window.

In an embodiment of the present invention, the ICA training unit calculates the unmixing weight matrix with an iteration method, and, if a result obtained from an execution of the iteration method by the ICA training unit does not match a predetermined value, a notification is issued to the input buffering unit, to enable the input buffering unit to output raw data in the same window, or the ICA training unit outputs the unmixing weight matrix to the ICA calculating unit.

Compared with the prior art, the independent component analysis processor according to the present invention employs a cyclically interleaving memory to realize the sliding window, and distributes loads to hardware according to the timing and complexity of calculation. Therefore, operations demanding more complex calculation may be executed in parallel, while operations demanding less complex calculation may be serially executed. Consequently, hardware cost and power consumption are reduced.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
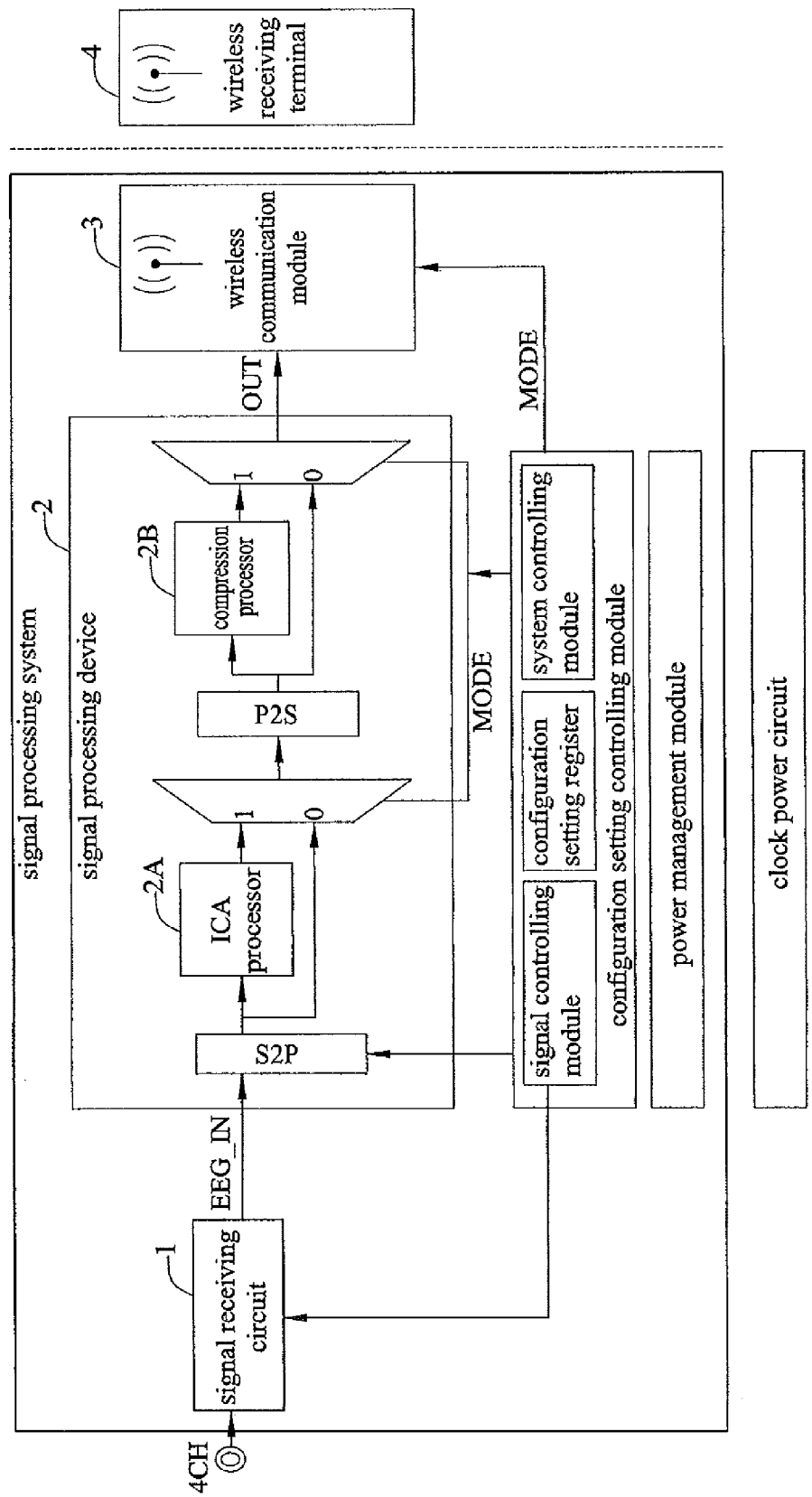
FIG. 1 illustrates a functional block diagram of a signal processing device having an ICA processor according to the present invention.

Referring to FIG. 1, a functional block diagram of a signal processing device 2 having an independent component analysis (ICA) processor 2A is illustrated according to the present invention. The ICA processor 2A is contained in the signal processing device 2. The signal processing device 2, a signal receiving circuit 1, a wireless communication module 3 such as a ZigBee wireless communication module, and a plurality of modules that are used for configuration setting controls or power management constitute a signal processing system that may be applied to process biological electric waves, such as electroencephalogram and electrocardiography or to perform a blind signal separation (BSS) process on voices.

The signal receiving circuit 1 comprises a low-pass filter, an amplifier, a high-pass filter, and an analog-to-digital converter (ADC) (not shown). The ADC converts received analog signals (e.g., 4-channel signals, 4CH) into digital signals, and samples the received signals to obtain raw data, which are transmitted in a serial form to the signal processing device 2. The signal processing device 2 converts the serial signals into multiple-channel parallel signals, and transmits the multiple-channel parallel signals to the ICA processor 2A. The ICA processor 2A separates independent component signals from the multiple-channel parallel signals, converts the independent component signals into serial signals, and transmits the serial signals to the compression processor 2B such as a Golomb-Rice non-loss compression processor, so as to increase an effective bandwidth for transmitting data and reduce transmission power consumed by the wireless communication module 3. The signal processing device 2 communicates via the wireless communication module 3 with a wireless receiving terminal 4. When the signal processing system analyzes the biological information, such as the electroencephalogram and electrocardiography, the wireless receiving terminal 4, which may be a notebook computer or other hand-held electronic devices such as a PDA, transmits the biological information to nursing stations, clinics or hospitals as a part of a health management system.

Figure 2:
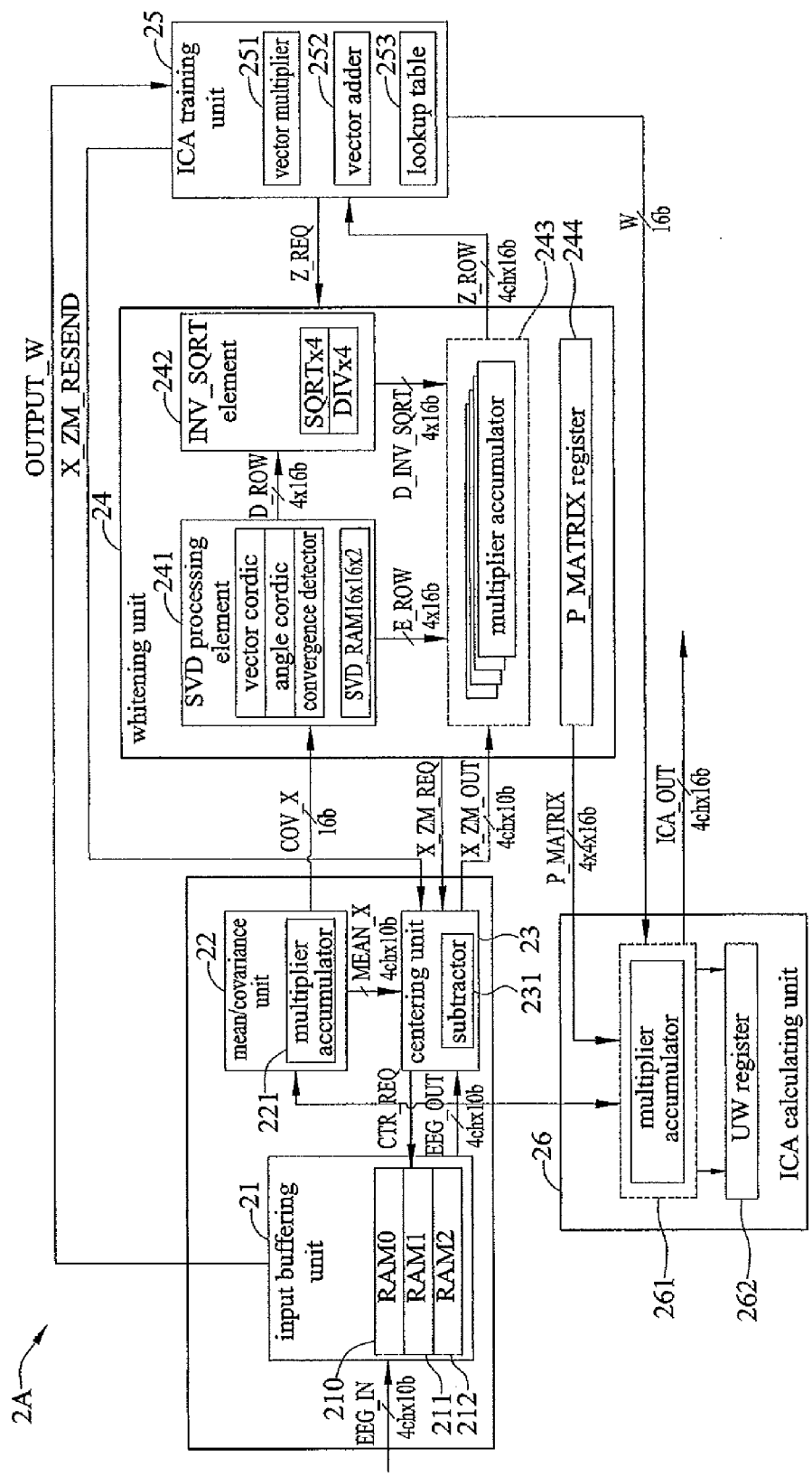
FIG. 2 is a functional block diagram of an ICA processor according to the present invention.

The ICA processor 2A may separate noises from signals. FIG. 2 illustrates a functional block diagram of the ICA processor 2A according to the present invention.

The ICA processor 2A comprises an input buffering unit 21, a mean/covariance unit 22, a centering unit 23, a whitening unit 24, an ICA training unit 25, and an ICA calculating unit 26.

The input buffering unit (IBU) 21 receives and stores the multiple-channel parallel signals. In an embodiment of the present invention, the signals have raw data X sampled by the signal receiving circuit 1. With an electroencephalography (EEG) as an example, the input buffering unit 21 receives signals EEG_in that are 4-channel parallel signals, and outputs signals EEG_OUT. The raw data X are output in the signals BEG_OUT.

In an embodiment of the present invention, the input buffering unit 21 employs an interleaving static random access memory (SRAM) to store and manage the raw data X. In an embodiment of the present invention, the input buffering unit 21 may employ a cyclic memory having three memory banks to realize a sliding window. As shown in FIG. 2, the three memory banks include a first memory bank RAM0 210, a second memory bank RAM1 211 and a third memory bank RAM2 212. Note that a window size may be as large as 64 sets of data, and a memory bank size may be as large as 32 sets of data. Accordingly, two memory banks may be selected sequentially to serve as a working window.

The raw data X received by the input buffering unit 21 may be stored in the first, the second and the third memory banks RAM0 210, RAM1 211 and RAM2 212 sequentially. In other words, when the second memory bank RAM1 211 is full and the third memory bank RAM2 212 starts to store the raw data X, the input buffering unit 21 outputs the raw data X to the centering unit 23, the whitening unit 24, the multiplier accumulator 243, the ICA training unit 25 and the ICA calculating unit 26 for further processes. Accordingly, when the third memory bank RAM2 212 keeps storing the raw data X, the raw data X stored in the first and second memory banks RAM0 210 and RAM1 211 are output sequentially. As the third memory bank RAM2 212 is full of the raw data X, the input raw data X will be cyclically returned to the origin and be stored in the first memory bank RAM0 210, and the raw data X stored in the second memory bank RAM1 211 will be output for further operations.

Compared with the ping-pong memory in the prior art, which needs a large memory structure, the present invention employs a cyclic memory that is composed of median-sized memory banks. In the present invention, the memory is divided into small blocks, e.g., by dividing a memory of 64 sets of data into two memory banks of 32 sets of data, and a sliding window is used to sequentially select two of the three memory banks as working windows. Therefore, the space for storing data is reduced, and the hardware is simple and consumes less power.

The mean/covariance unit 22 calculates a mean MEAN_X and a covariance COV_X of the raw data X. In FIG. 2, the signals EEG_OUT are transmitted from the input buffering unit 21 to the mean/covariance unit 22, and the mean/covariance unit 22 calculates the mean MEAN_X and the covariance COV_X of the raw data X in the signals EEG_OUT. The mean/covariance unit 22 employs a commonly-shared multiplier accumulator (MAC) 221 to calculate the mean MEAN_X and the covariance COV_X of the raw data.

The centering unit 23 removes direct components in the raw data X according to the mean MEAN_X of the raw data X. The centering unit 23 may use a subtractor 231 to remove direct components in channels in the raw data X, to obtain zero-mean data X_ZM_OUT that have a zero-mean. In FIG. 2, the signals EEG_OUT are transmitted from the input buffering unit 21 to the centering unit 23, and the centering unit 23 performs a centering process on the raw data X in the signals EEG_OUT.

The centering process relates to a mathematic expression, $$X(j) = X(j) - E\{X(m)\} = X(j) - \frac{1}{64}\sum_{i=1}^{64}X(i),$$

where j=1 . . . 4, i=1 . . . 64, j may be determined by a number of channels that is converted by the signal processing device 2, and i may be changed with j.

The whitening unit 24 receives and performs a whitening process on the covariance COV_X of the raw data X and the zero-mean data X_ZM_OUT, to obtain a whitening matrix P_MATRIX and an uncorrelated matrix Z_ROW.

In an embodiment of the present invention, the whitening unit 24 comprises a singular value decomposition (SVD) processing element 241 (hereinafter referred to as "SVD processing element"), an inverse square root (INV_SQRT) element 242 (hereinafter referred to as "INV_SQRT element") and a plurality of multiplier accumulators 243 and P_MATRIX registers 244.

In operation, the SVD processing element 241 receives the covariance COV_X of the raw data X and calculates an eigenvalue matrix D_ROW and an eigenvectar matrix E_ROW of the covariance COV_X, the INV_SQRT element 242 receives the eigenvalue matrix D_ROW and calculates an inverse square root D_INV_SQRT of the eigenvalue matrix D, the multiplier accumulators 243 calculate a whitening matrix P_MATRIX according to the eigenveetor matrix E_ROW and the inverse square root D_INV_SQRT of the whitening matrix P_MATRIX, and the multiplier accumulators 243 further calculate an uncorrelated data stream Z_ROW according to the whitening matrix P_MATRIX and the zero-mean data XZM and store the whitening matrix P_MATRIX in the P_MATRIX registers 244. The whitening process relates to a mathematical expression $Cov(X)=E(XX^T)=EDE^T$, $P=ED^{-1/2}E^T$, $Z=PX$.

The ICA training unit 25 receives the uncorrelated data stream Z_ROW and calculates an unmixing matrix. In FIG. 2, the ICA training unit 25 may employ the commonly-shared vector multiplier 251, vector adder 252 and lookup table (LUT) 253 to calculate an unmixing weight matrix W and transmit the unmixing weight matrix W to the ICA calculating unit 26. The unmixing weight matrix W calculated by the ICA training unit 25 is stored in a register (not shown), and the unmixing weight matrix W is not output until the OUTPUT_W output by the input buffering unit 21 is received.

The ICA calculating unit 26 receives the unmixing weight matrix W, the whitening matrix P_MATRIX and the raw data X to calculate a whitening unmixing matrix UW, and outputs independent component signals ICA_OUT that are separated from the parallel signals received from the ICA processor 2A. The ICA calculating unit 26 comprises a multiplier accumulator 261 and a UW register 262, and stores the calculated whitening unmixing matrix UW in the UW register 262.

In operation, the ICA training unit 25 issues Z_REQ to the whitening unit 24; the whitening unit 24, when receiving Z_REQ, issues X_ZM_REQ to the centering unit 23; the centering unit 23, when receiving X_ZM_REQ, issues CTR_REQ to the input buffering unit 21; and the input buffering unit 21, when receiving CTR_REQ, issues the raw data X to the centering unit 23 for removing direct components. X_ZM_OUT is then output to the whitening unit 24 for whitening calculation. An uncorrelated data stream Z_ROW is then output to the ICA training unit 25. Before sending the raw data X to the ICA calculating unit 26 and the centering unit 23, the input buffering unit 21 issues a notification OUTPUT_W, to enable the ICA training unit 25 to send an unmixing weight matrix W calculated by a previous window (e.g., the unmixing weight matrix W calculated from the raw data in the RAM0 and RAM1 of the input buffering unit 21) to the ICA calculating unit 26 for ICA calculation.

In order to find the unmixing weight matrix W that may be used to estimate the independent component signals, the ICA training unit 25 and the ICA calculating unit 26 execute Infomax ICA algorithms as follows:

(a) u(n)=W(n)*Z(n), where u(n) are estimated signals, W(n) the unmixing weight matrix W, and Z(n) whitening data;

$$phi(u(n)) = \text{diag}(Lrate) + Lrate * \left(1 - \frac{2}{1+\exp(-u(n))} * u(n)^T\right), \quad (b)$$

where phi(u(n)) employs Lrate in an embodiment that the ICA processor 2A process Electroencephalography, and Lrate indicates a learning rate;

(c) W(n+1)=W(n)+phi(u(n))*W(n);

(d) W_change=W(n+1)−W(n);

(e) when ∥W_change∥<8.9407×10$^{-8}$, proceed to mathematical expression (g), or, proceed to mathematical expression (f);

(f) W(n)←W(n+1), proceed to mathematical expression (a); and (g) UW(k)=W(k)*P(k), ICA_OUT(k)=UW(k)*X(k), where mathematical expressions (a) to (f) are the iterations performed in the kth window, n a number of the iterations, (g) an operation performed in the (k)th window, UW an unmixing matrix that is whitened, and ICA_OUT independent component signals that are separated from the separated from the signals received by the ICA processor 2A.

The unmixing weight matrix W is calculated by the mathematic expressions (c) to (e) iteratively, that is, determining whether a difference between unmixing weight matrixes W(n) and W(n+1) calculated by former and latter iterations in the kth window, respectively, is less than a predetermined value. When the difference between the unmixing weight matrixes W(n) and W(n+1) is less than 8.9407×10$^{-8}$, the ICA training unit 25 stores W(n+1) in a register. When W(n+2) is calculated, since notification of the input buffering unit 21 is received and W(n+1) is output to the ICA calculating unit 26, the ICA processor of the present invention may perform a real-time independent component analysis. If the difference is not less than the predetermined value when the ICA training unit 25 is executing the mathematical expressions (c) to (e), a notification X_ZM_RESEND is issued via the centering unit 23 to the input buffering unit 21, to enable the input buffering unit 21 to send raw data in the same window for recalculation. Since the mean/covariance unit 22, the SVD processing element 241 and the INV_SORT element 242 calculate raw data in the same window one time only, the whitening unit 24 does not need to recalculate the whitening matrix P_MATRIX.

Figure 3:
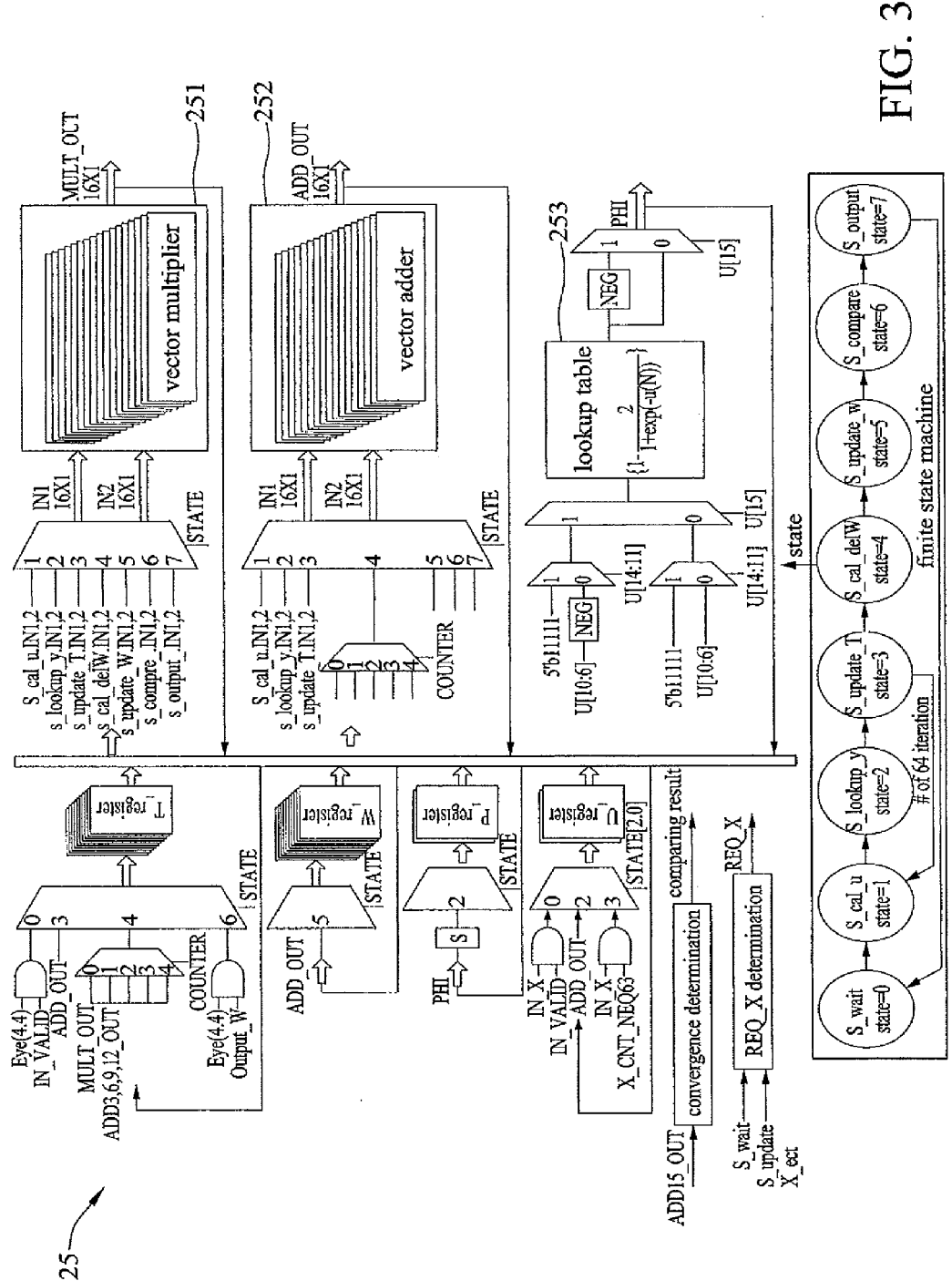
FIG. 3 is a functional block diagram of an ICA training unit of the ICA processor according to the present invention.

Referring to FIG. 3, a functional block diagram of the ICA training unit 25 of the ICA processor is shown according to the present invention. The ICA training unit 25 comprises a vector multiplier 251, a vector adder 252 and a lookup table 253. In a preferred embodiment of the present invention, the vector adder 252 and the vector multiplier 251 are composed of 16 adders and 16 multipliers, respectively, to increase operation efficiency.

Figure 4:
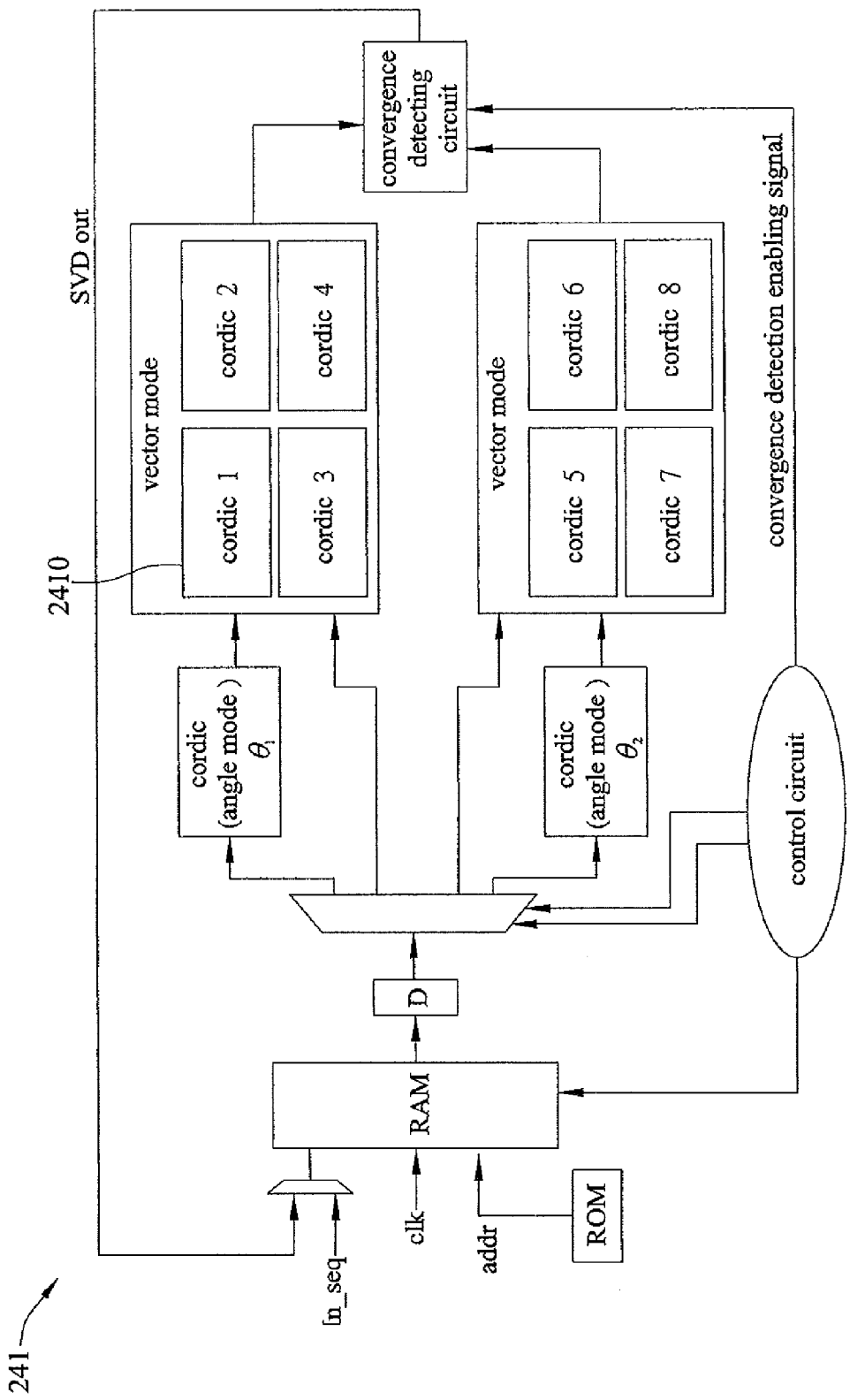
FIG. 4 is a functional block diagram of an SVD processing element of a whitening unit of an ICA processor according to the present invention.

FIG. 4 is a functional block diagram of an SVD processing element 241 of a whitening unit of an ICA processor according to the present invention. In an embodiment shown in FIG. 4, the SVD processing element 241 may comprise eight CORDIC units 2410. With the eight CORDIC units to decompose Jacobi singular values in parallel, processing speed can be increased, and a real-time function can be achieved.

The ICA processor 2A of the present invention may employ a very large scale integration (VLSI) to realize the Infomax ICA algorithms. For example, the ICA processor may be fabricated as a chip having an area of $1133 \times 1133 \,\mu m^2$, and a frequency of as high as 60 MHz. The ICA processor is thus compact and portable, so as to be feasible for medical appliances.

Figure 5A:
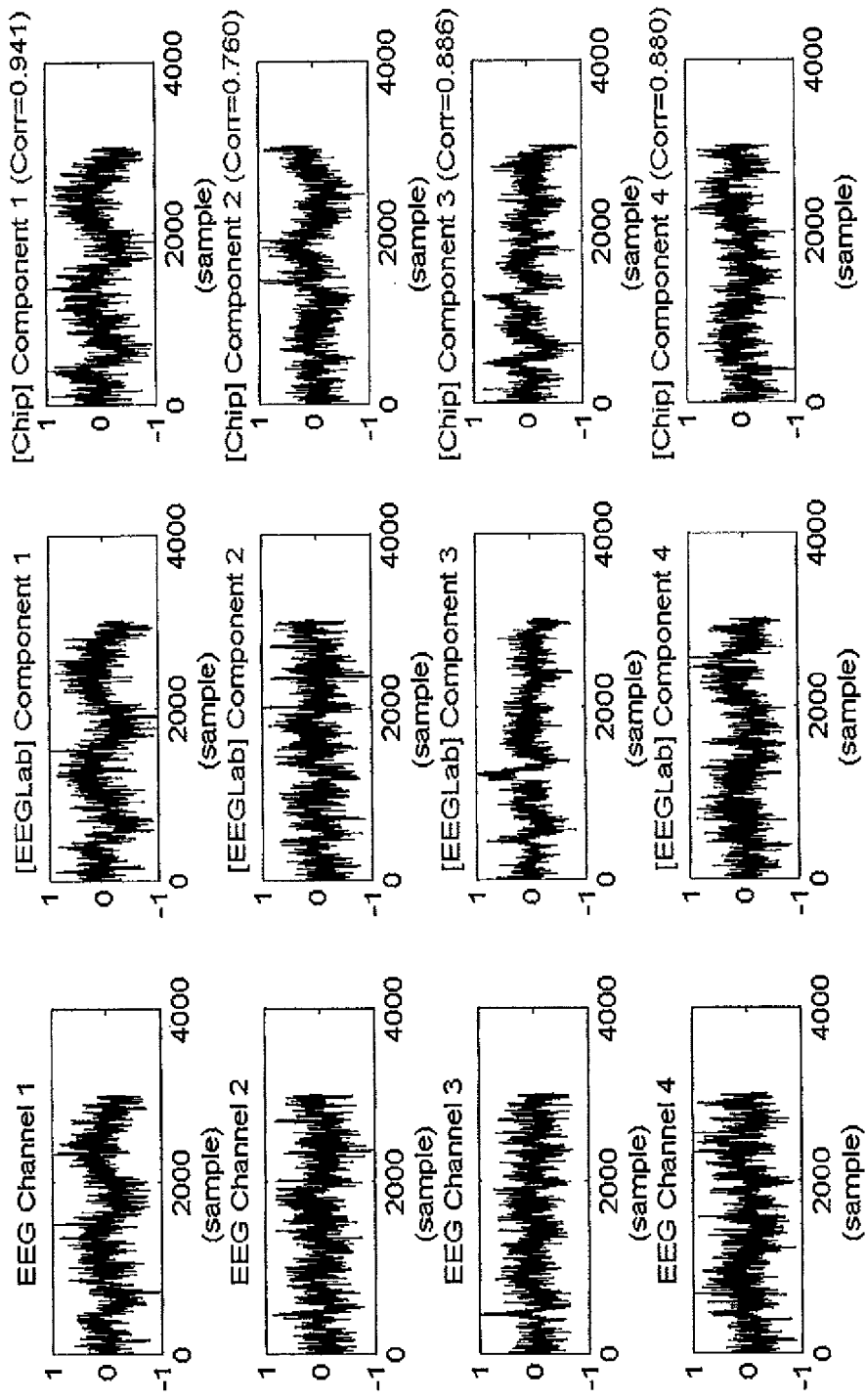
FIG. 5A is an experiment diagram of an ICA processor that is applied to an independent component analysis for an electroencephalography according to the present invention.
Figure 5B:
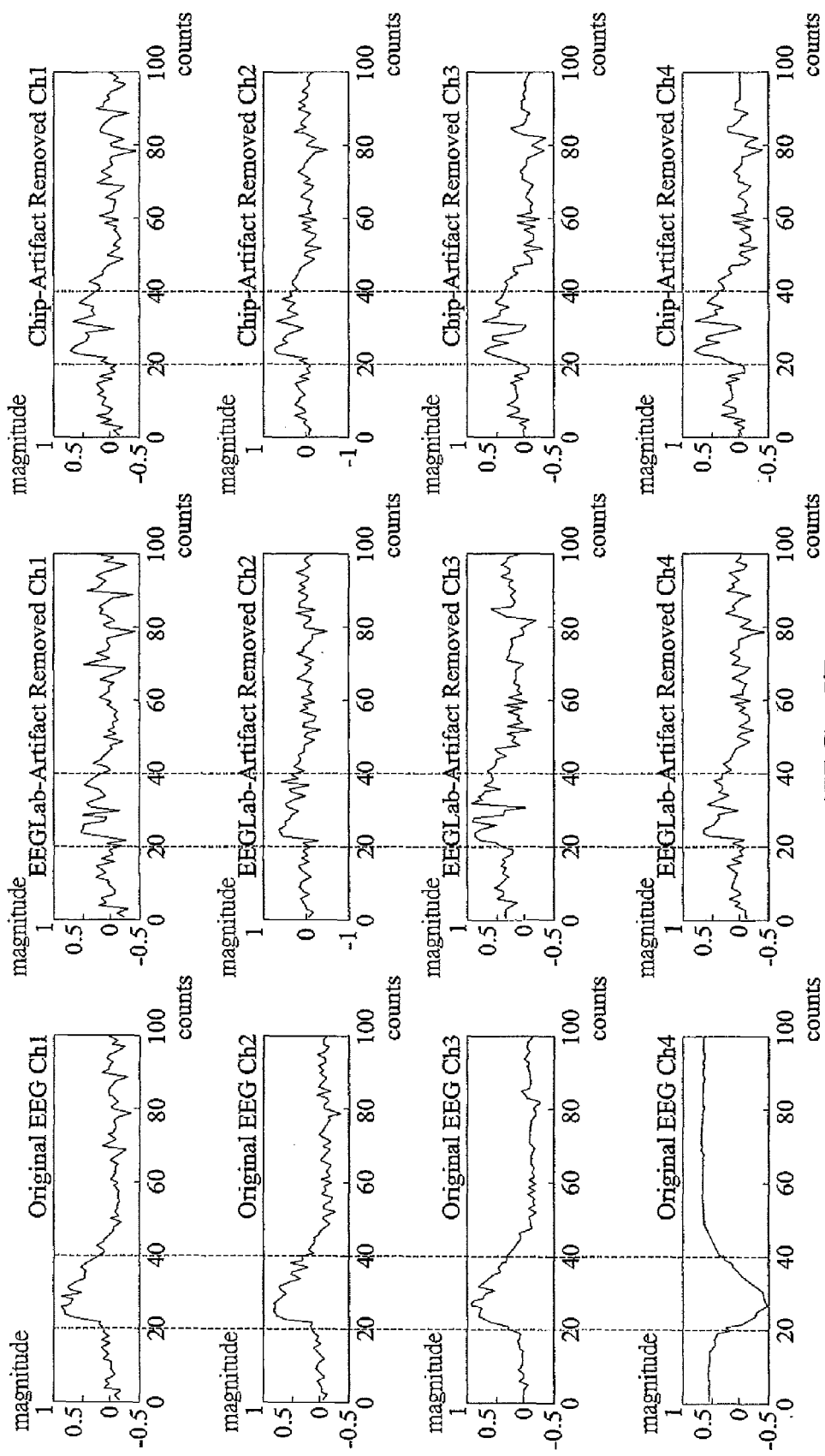
FIG. 5B is an experiment diagram of an ICA processor that is applied to a noise removing process for an electroencephalography according to the present invention.

As another embodiment, the ICA processor 2A of the present invention may be applied to separate independent component signals of electroencephalography from super-Gaussian signals. FIG. 5A is an experiment diagram of an ICA processor that is applied to an independent component analysis for an electroencephalography according to the present invention, wherein EEG channel 1 to EEG channel 4 are magnitudes of measured electroencephalography, [EEGLab]component 1 to [EEGLab]component 4 are magnitudes of electroencephalography obtained by public software (EEGLab) developed by the University of California, San Diego that conducts an independent component analysis, and [Chip] component 1 to [Chip]component 4 are magnitudes of electroencephalography obtained by the chip fabricated by the ICA processor 2A of the present invention that conducts the independent component analysis. It is known from FIG. 5A that the results obtained by the ICA processor of the present invention and by the public software (EEGLab) developed by the UC San Diego that conducts the independent component analysis are pretty similar. FIG. 5B is an experiment diagram of an ICA processor that is applied to a noise removing process for an electroencephalography according to the present invention, Original EEG Ch1 to Original EEG Ch4 indicate measured electroencephalography, wherein the $20^{th}$ to $40^{th}$ electroencephalography raw data show that the signals rise abruptly, indicating noises generated while eyes are blinking. EEGLab-Artifact Removed Ch1 to EEGLab-Artifact Removed Ch4 are electroencephalography where noises are removed by standard software. Chip-Artifact Removed Ch1 to Chip-Artifact Removed Ch4 are electroencephalography where noises are removed by the ICA processor of the present invention after conducting the independent component analysis. It is known from FIG. 5B, the application of the present invention may also remove the noises accurately. It can be known from FIGS. 5A and 5B that the ICA processor of the present invention may separate independent components from measured or monitored signals in real-time, and signals free of noises may be obtained by removing the separated noises and performing a back-projection calculation (which may be cooperated with other off-line calculations).

Figure 6A:
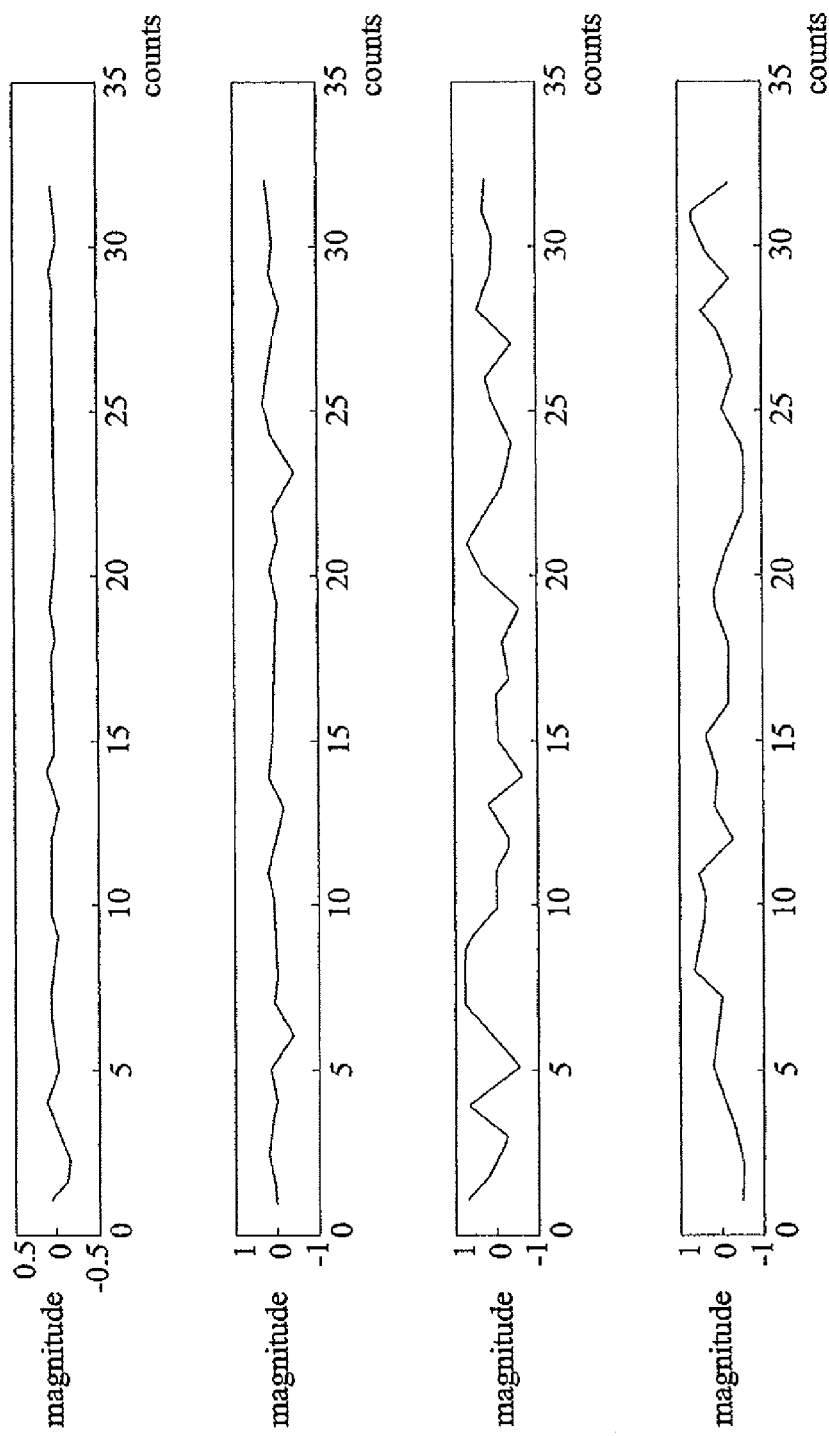
FIGS. 6A-6C are simulation diagrams of an ICA processor that uses super-Gaussian signals according to the present invention.
Figure 6B:
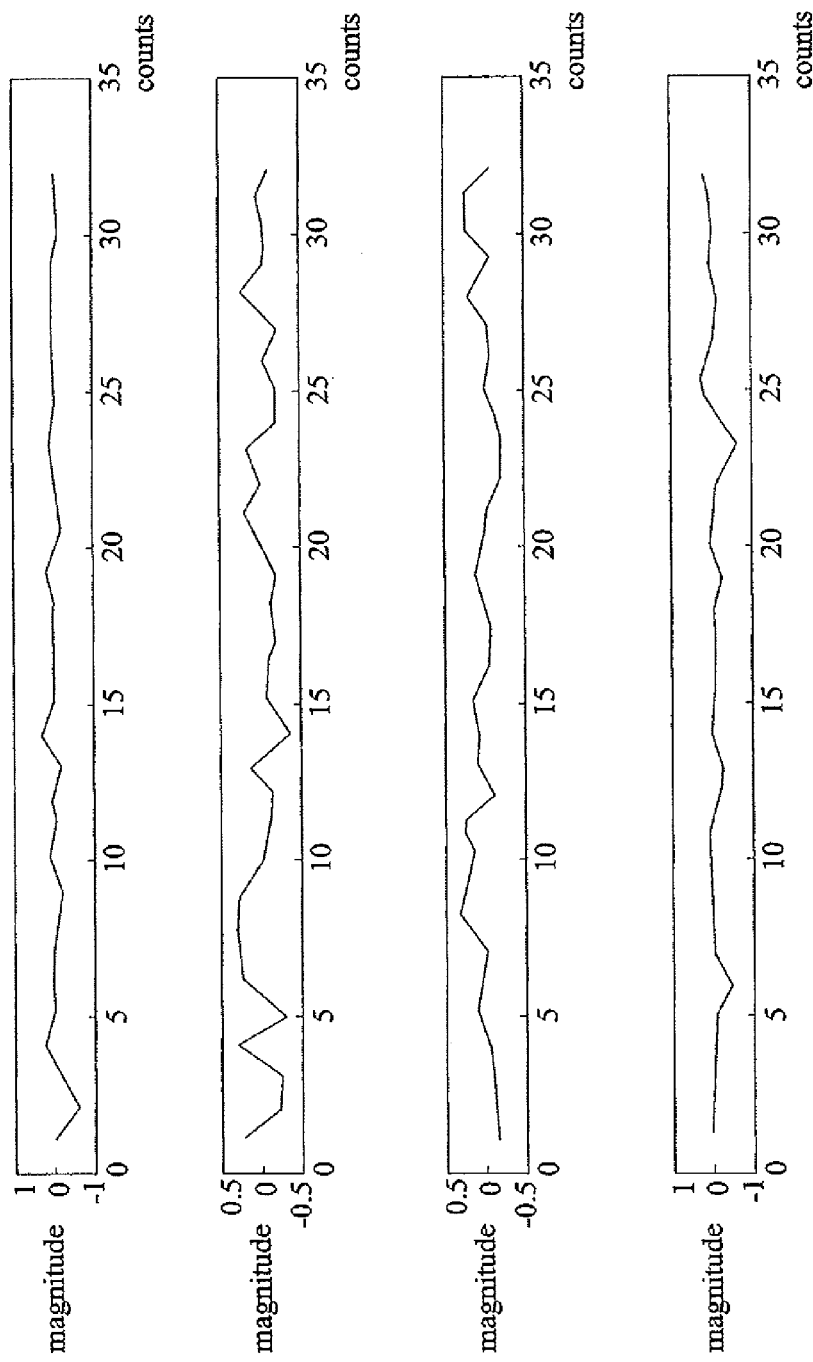
Figure 6C:
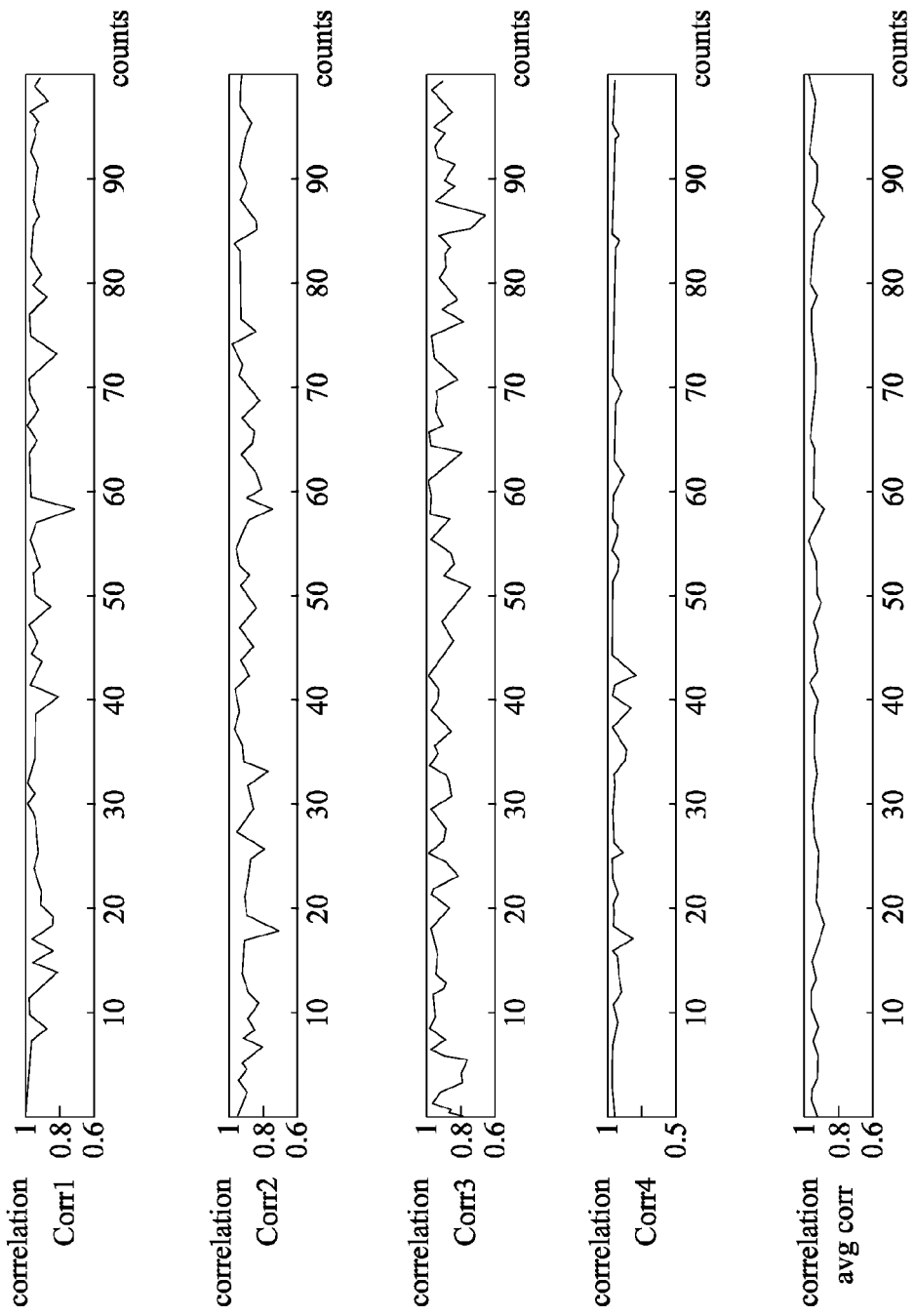

FIGS. 6A-6C are simulation diagrams of an ICA processor that uses super-Gaussian signals according to the present invention, which show the magnitudes of raw data of a memory bank. FIG. 6A shows super-Gaussian original test signals; FIG. 6B shows separated independent component analysis signals; and FIG. 6C shows the correlation between the super-Gaussian original test signals and the separated independent component analysis signals. One of the memory banks has 32 sets of data. These figures show raw data of 101 banks. It is known from FIG. 6C that the super-Gaussian original test signals and the separated independent component analysis signals have an average correlation greater than 0.9044.

In sum, the ICA processor provided by the present invention may separate independent component signals from received signals, for removing noises in the signals, and may be applied by blind signal separation or biological signals such as electroencephalogram and electrocardiography. The input buffering unit of the ICA processor employs a sliding window to realize the storage of raw data, so as to analyze the signals in real-time. The whitening unit of the ICA processor may speed up the convergence of the ICA training unit when conducting an ICA calculation. Therefore, noises in the signals can be removed by the independent component analysis processor that conducts an independent component analysis process on multiple-channel parallel signals, and a back-projection process may be then performed, so as to obtain signals free of noises.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. An independent component analysis processor for performing an independent component analysis process on multiple-channel parallel signals having raw data, comprising:
the independent component analysis processor being operably connected to an Electroencephalography (EEG) machine, and configured to process data from a plurality of sensors of the Electroencephalography (EEG) machine;
an input buffering unit that receives and stores the multiple-channel parallel signals and outputs the raw data;
a mean/covariance unit that calculates a mean and a covariance of the raw data;
a centering unit that centers the raw data according to the mean of the raw data, to obtain zero-mean data;
a whitening unit that receives and performs a whitening process on the covariance of the raw data and the zero-mean data, to obtain a whitening matrix and an uncorrelated data stream;
an independent component analysis (ICA) training unit that receives the uncorrelated data stream from the whitening unit and calculates an unmixing weight matrix; and
an ICA calculating unit that receives the unmixing weight matrix and the whitening matrix, calculates a whitening unmixing matrix, and calculates independent components of the multiple-channel parallel signals according to the whitening unmixing matrix and the raw data,
wherein the input buffering unit comprises an interleaving memory having at least three cyclic memory banks for sequentially storing the raw data in the multiple-channel parallel signals, the input buffering unit employs the interleaving memory that comprises the at least three cyclic memory banks to realize a sliding window, and the sliding window is used to sequentially select two of the at least three cyclic memory banks as working windows,
wherein the raw data received by the input buffering unit is stored in a first memory bank, a second memory bank, and a third memory bank sequentially, the raw data stored in the first and second memory banks being output sequentially when the third memory bank starts to store the raw data, and the raw data being cyclically returned to be stored in the first memory bank when the third memory bank is full of the raw data, wherein the ICA training unit calculates the unmixing weight matrix with an iteration method, and, if a difference between unmixing weight matrixes W(n) and W(n+l) that are calculated by former and latter iterations in a kth window, respectively, is less than a predetermined value, the ICA training unit stores the unmixing weight matrix W(n+l) in a register and outputs the unmixing weight matrix W(n+l) to the ICA calculating unit, or a notification is issued to the input buffering unit to enable the input buffering unit to send raw data in the kth window for recalculation, wherein the input buffering unit, before transmitting raw data in kth window to the ICA calculating unit, issues a notification to the ICA training unit to enable the ICA training unit to transmit an unmixing weight matrix W(k) to the ICA calculating unit, wherein the input buffering unit's sequentially storing of the raw data, the centering unit's centering, the whitening unit's whitening process, and the ICA training unit's calculation are performed sequentially, and the ICA training unit's and the ICA calculating unit's calculations are performed in parallel, wherein the mean/covariance unit calculates the mean and the covariance of the raw data and the whitening unit performs the whitening process only one time in the kth window, wherein a sliding window size, a memory bank size, and a correlation between the raw data and the independent components of the multiple-channel parallel signals are related to one another, such that the sliding window size is evaluated according to the memory bank size and the correlation, and wherein the whitening unit comprises a plurality of CORDIC units that operate in parallel.

2. The independent component analysis processor of claim 1, wherein the mean/covariance unit comprises and uses a multiplier accumulator to calculate the mean and the covariance of the raw data.

3. The independent component analysis processor of claim 1, wherein the centering unit comprises and uses a subtraetor to remove direct current components of channels in the raw data.

4. The independent component analysis processor of claim 1, wherein the whitening unit comprises:
   a singular value decomposition processing element that receives the covariance of the raw data and calculates an eigenvalue matrix and an eigenvector matrix of the covariance;
   an inverse square root element that receives the eigenvalue matrix and calculates an inverse square root of the eigenvalue matrix; and
   a multiplier accumulator that calculates the whitening matrix according to the eigenvector matrix and the inverse square root of the eigenvalue matrix, and calculates the uncorrelated data stream according to the whitening matrix and the zero-mean data.

5. The independent component analysis processor of claim 1, wherein the ICA training unit comprises and uses a vector multiplier, a vector adder and a lookup table to calculate the unmixing weight matrix.

6. The independent component analysis processor of claim 1, wherein the ICA calculating unit comprises and uses a multiplier accumulator to calculate the whitening unmixing matrix.

7. The independent component analysis processor of claim 1, wherein the ICA training unit and the ICA calculating unit execute Infomax ICA algorithms.

8. The independent component analysis processor of claim 1, wherein the CORDIC units are vector mode CORDIC units, the whitening unit further comprises first and second angle mode CORDIC units that generate first and second angles, respectively, in a parallel manner, some of the vector mode CORDIC units receive the first angle and perform a first vector mode calculation in parallel based on the first angle, the rest of the vector mode CORDIC units receive the second angle and perform a second vector mode calculation in parallel based on the second angle, and all the vector mode CORDIC units perform the first and second vector mode calculation in parallel.

* * * * *